(12) United States Patent
Yu et al.

(10) Patent No.: US 10,798,775 B2
(45) Date of Patent: Oct. 6, 2020

(54) TECHNIQUES AND APPARATUSES FOR DUPLICATION BEARER MANAGEMENT

(71) Applicant: QUALCOMM Incorporated, San Diego, CA (US)

(72) Inventors: Yu-Ting Yu, Union City, CA (US); Keiichi Kubota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/057,265

(22) Filed: Aug. 7, 2018

(65) Prior Publication Data
US 2019/0053325 A1 Feb. 14, 2019

Related U.S. Application Data

(60) Provisional application No. 62/543,924, filed on Aug. 10, 2017.

(51) Int. Cl.
| | | |
|---|---|---|
| *H04W 76/32* | (2018.01) | |
| *H04W 76/25* | (2018.01) | |
| *H04W 76/15* | (2018.01) | |
| *H04W 76/28* | (2018.01) | |
| *H04W 28/06* | (2009.01) | |

(52) U.S. Cl.
CPC .......... *H04W 76/32* (2018.02); *H04W 28/06* (2013.01); *H04W 76/15* (2018.02); *H04W 76/25* (2018.02); *H04W 76/28* (2018.02)

(58) Field of Classification Search
CPC ..... H04W 76/32; H04W 28/06; H04W 76/28; H04W 76/15; H04W 76/25
See application file for complete search history.

(56) References Cited

U.S. PATENT DOCUMENTS

| | | | | |
|---|---|---|---|---|
| 2009/0201805 | A1* | 8/2009 | Begen | H04L 1/22 370/225 |
| 2016/0057585 | A1* | 2/2016 | Horn | H04L 45/306 370/312 |
| 2016/0182276 | A1* | 6/2016 | Wu | H04W 76/19 370/225 |
| 2017/0127473 | A1* | 5/2017 | Virtej | H04W 76/38 |

(Continued)

OTHER PUBLICATIONS

CATT: "PDCP Duplication", 3GPP Draft; R2-1703114, 3rd Generation Partnership Project (3GPP), Mobile Competence Centre; 650, Route Des Lucioles; F-06921, Sophia-Antipolis Cedex; France, vol. RAN WG2, No. Spokane, USA; Apr. 3, 2017-Apr. 7, 2017 Mar. 25, 2017, XP051254404, Retrieved from the Internet: URL:http://www.3gpp.org/ftp/tsg_ran/WG2_RL2/TSGR2_97bis/Docs/ [retrieved on Mar. 25, 2017], 3 pages.

(Continued)

*Primary Examiner* — Andrew Lai
*Assistant Examiner* — Harry H Kim
(74) *Attorney, Agent, or Firm* — Harrity & Harrity, LLP

(57) ABSTRACT

Certain aspects of the present disclosure generally relate to wireless communication. In some aspects, a device may determine a deactivation of a duplication bearer for a packet data convergence protocol (PDCP) connection, wherein a first link and a second link are configured for the duplication bearer. The device may schedule data communication for the first link and not for the second link based at least in part on the deactivation of the duplication bearer. Numerous other aspects are provided.

31 Claims, 12 Drawing Sheets

(56) References Cited

U.S. PATENT DOCUMENTS

| | | | |
|---|---|---|---|
| 2017/0150512 A1* | 5/2017 | Cao | H04W 72/1205 |
| 2018/0063830 A1* | 3/2018 | Lee | H04L 5/0057 |
| 2018/0279168 A1* | 9/2018 | Jheng | H04W 76/20 |
| 2018/0279358 A1* | 9/2018 | Babaei | H04W 72/14 |
| 2018/0310202 A1* | 10/2018 | Lohr | H04W 76/27 |
| 2018/0368132 A1* | 12/2018 | Babaei | H04W 72/042 |
| 2019/0037447 A1* | 1/2019 | Lee | H04W 28/18 |
| 2019/0082366 A1* | 3/2019 | Miao | H04W 36/0027 |
| 2019/0141769 A1* | 5/2019 | Jin | H04L 43/10 |
| 2019/0254115 A1* | 8/2019 | Baek | H04W 28/06 |
| 2020/0119864 A1* | 4/2020 | Xu | H04W 76/15 |

OTHER PUBLICATIONS

Ericsson: "Further Aspects of Data Duplication in PDCP Layer", 3GPP Draft; R2-1700834, Further Aspects of Data Duplication in PDCP Layer, 3rd Generation Partnership Project (3GPP), Mobile Competence Centre; 650, Route Des Lucioles; F-06921, Sophia-Antipolis Cedex; France, vol. RAN WG2, No. Athens, Greece; Feb. 13, 2017-Feb. 17, 2017 Feb. 3, 2017, XP051223012, Retrieved from the Internet: URL:http://www.3gpp.org/ftp/tsg_ran/WG2_RL2/TSGR2_97/Docs/ [retrieved on Feb. 3, 2017], 3 pages.

Interdigital Communications: "Packet Duplication at PDCP", 3GPP Draft; R2-1701186 (NR SI AI10212) URLLC Packet Duplication at PDCP, 3rd Generation Partnership Project (3GPP), Mobile Competence Centre; 650, Route Des Lucioles; F-06921, Sophia-Antipolis Cedex; France, vol. RAN WG2, No. Athens, Greece; Feb. 13, 2017-Feb. 17, 2017 Feb. 4, 2017, XP051223409, Retrieved from the Internet: URL:http://www.3gpp.org/ftp/tsg_ran/WG2_RL2/TSGR2_97/Docs/ [retrieved on Feb. 4, 2017], 2 pages.

International Search Report and Written Opinion—PCT/US2018/045745—ISA/EPO—dated Nov. 8, 2018.

Nokia et al., "Duplication Impacts to PDCP", 3GPP Draft; R2-1704276 Duplication Impacts to PDCP, 3rd Generation Partnership Project (3GPP), Mobile Competence Centre; 650, Route Des Lucioles; F-06921, Sophia-Antipolis Cedex; France, vol. RAN WG2, No. Hangzhou, China; May 15, 2017-May 19, 2017 May 4, 2017, XP051263562, Retrieved from the Internet: URL:http://www.3gpp.org/ftp/tsg_ran/WG2_RL2/TSGR2_98/Docs/ [retrieved on May 4, 2017], 5 pages.

* cited by examiner

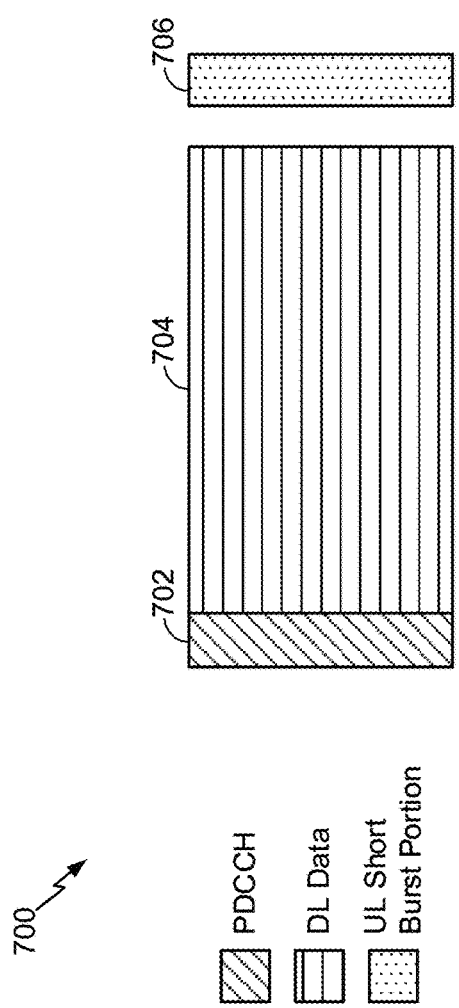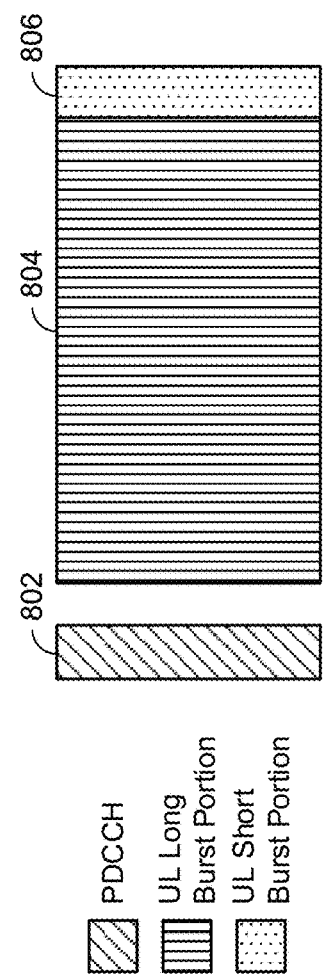

TECHNIQUES AND APPARATUSES FOR DUPLICATION BEARER MANAGEMENT

CROSS-REFERENCE TO RELATED APPLICATIONS UNDER 35 U.S.C. § 119

This application claims priority to Provisional Patent Application No. 62/543,924, filed on Aug. 10, 2017, entitled "TECHNIQUES AND APPARATUSES FOR DUPLICATION BEARER MANAGEMENT," which is hereby expressly incorporated by reference herein.

FIELD OF THE DISCLOSURE

Aspects of the present disclosure generally relate to wireless communication, and more particularly to techniques and apparatuses for duplication bearer management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include determining, by a device, a deactivation of a duplication bearer for a packet data convergence protocol (PDCP) connection, wherein a first link and a second link are configured for the duplication bearer. The method may include scheduling, by the device, data communication for the first link and not for the second link based at least in part on the deactivation of the duplication bearer.

In some aspects, a method of wireless communication may include establishing, by a user equipment, a duplication bearer for a PDCP connection to a network, wherein a first link is a default link for the duplication bearer and a second link is a duplication link for the duplication bearer. The method may include detecting, by the user equipment, a failure of the first link. The method may include indicating, by the user equipment and to the network, the failure of the first link.

In some aspects, a method of wireless communication may include establishing, by a base station, a duplication bearer for a PDCP connection to a user equipment, wherein a first link is a default link for the duplication bearer and a second link is a duplication link for the duplication bearer. The method may include receiving, by the base station, an indication of a failure of the first link. The method may include reestablishing, reconfiguring, releasing, or resetting, by the base station, the duplication bearer after receiving the indication of the failure of the first link.

In some aspects, a device for wireless communication may include a memory and one or more processors operatively coupled to the memory. The one or more processors may be configured to determine a deactivation of a duplication bearer for a PDCP connection, wherein a first link and a second link are configured for the duplication bearer. The one or more processors may be configured to schedule data communication for the first link and not for the second link based at least in part on the deactivation of the duplication bearer.

In some aspects, a user equipment for wireless communication may include a memory and one or more processors operatively coupled to the memory. The one or more processors may be configured to establish a duplication bearer for a PDCP connection to a network, wherein a first link is a default link for the duplication bearer and a second link is a duplication link for the duplication bearer. The one or more processors may be configured to detect a failure of the first link. The one or more processors may be configured to indicate, to the network, the failure of the first link.

In some aspects, a base station for wireless communication may include a memory and one or more processors operatively coupled to the memory. The one or more processors may be configured to establish a duplication bearer for a PDCP connection to a user equipment, wherein a first link is a default link for the duplication bearer and a second link is a duplication link for the duplication bearer. The one or more processors may be configured to receive an indication of a failure of the first link. The one or more processors may be configured to reestablish, reconfigure, release, or reset the duplication bearer after receiving the indication of the failure of the first link.

In some aspects, a non-transitory computer-readable medium may store one or more instructions for wireless communication. The one or more instructions, when executed by one or more processors of a device, may cause the one or more processors to determine a deactivation of a duplication bearer for a PDCP connection, wherein a first link and a second link are configured for the duplication bearer. The one or more instructions, when executed by the one or more processors, may cause the one or more processors to schedule data communication for the first link and not for the second link based at least in part on the deactivation of the duplication bearer.

In some aspects, a non-transitory computer-readable medium may store one or more instructions for wireless communication. The one or more instructions, when executed by one or more processors of a user equipment, may cause the one or more processors to establish a duplication bearer for a PDCP connection to a network, wherein a first link is a default link for the duplication bearer and a second link is a duplication link for the duplication bearer. The one or more instructions, when executed by the one or more processors, may cause the one or more processors to detect a failure of the first link. The one or more instructions, when executed by the one or more processors, may cause the one or more processors to indicate, to the network, the failure of the first link.

In some aspects, a non-transitory computer-readable medium may store one or more instructions for wireless communication. The one or more instructions, when executed by one or more processors of a base station, may cause the one or more processors to establish a duplication bearer for a PDCP connection to a user equipment, wherein a first link is a default link for the duplication bearer and a second link is a duplication link for the duplication bearer. The one or more instructions, when executed by the one or more processors, may cause the one or more processors to receive an indication of a failure of the first link. The one or more instructions, when executed by the one or more processors, may cause the one or more processors to reestablish, reconfigure, release, or reset the duplication bearer after receiving the indication of the failure of the first link.

In some aspects, an apparatus for wireless communication may include means for determining a deactivation of a duplication bearer for a PDCP connection, wherein a first link and a second link are configured for the duplication bearer. The apparatus may include means for scheduling data communication for the first link and not for the second link based at least in part on the deactivation of the duplication bearer.

In some aspects, an apparatus for wireless communication may include means for establishing a duplication bearer for a PDCP connection to a network, wherein a first link is a default link for the duplication bearer and a second link is a duplication link for the duplication bearer. The apparatus may include means for detecting a failure of the first link. The apparatus may include means for indicating, to the network, the failure of the first link.

In some aspects, an apparatus for wireless communication may include means for establishing a duplication bearer for a PDCP connection to a user equipment, wherein a first link is a default link for the duplication bearer and a second link is a duplication link for the duplication bearer. The apparatus may include means for receiving an indication of a failure of the first link. The apparatus may include means for reestablishing, reconfiguring, releasing, or resetting the duplication bearer after receiving the indication of the failure of the first link.

Aspects generally include a method, apparatus, device, computer program product, non-transitory computer-readable medium, user equipment, wireless communication device, base station, access point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with various aspects of the present disclosure.

FIG. 8 is a diagram illustrating an example of an uplink (UL)-centric subframe, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
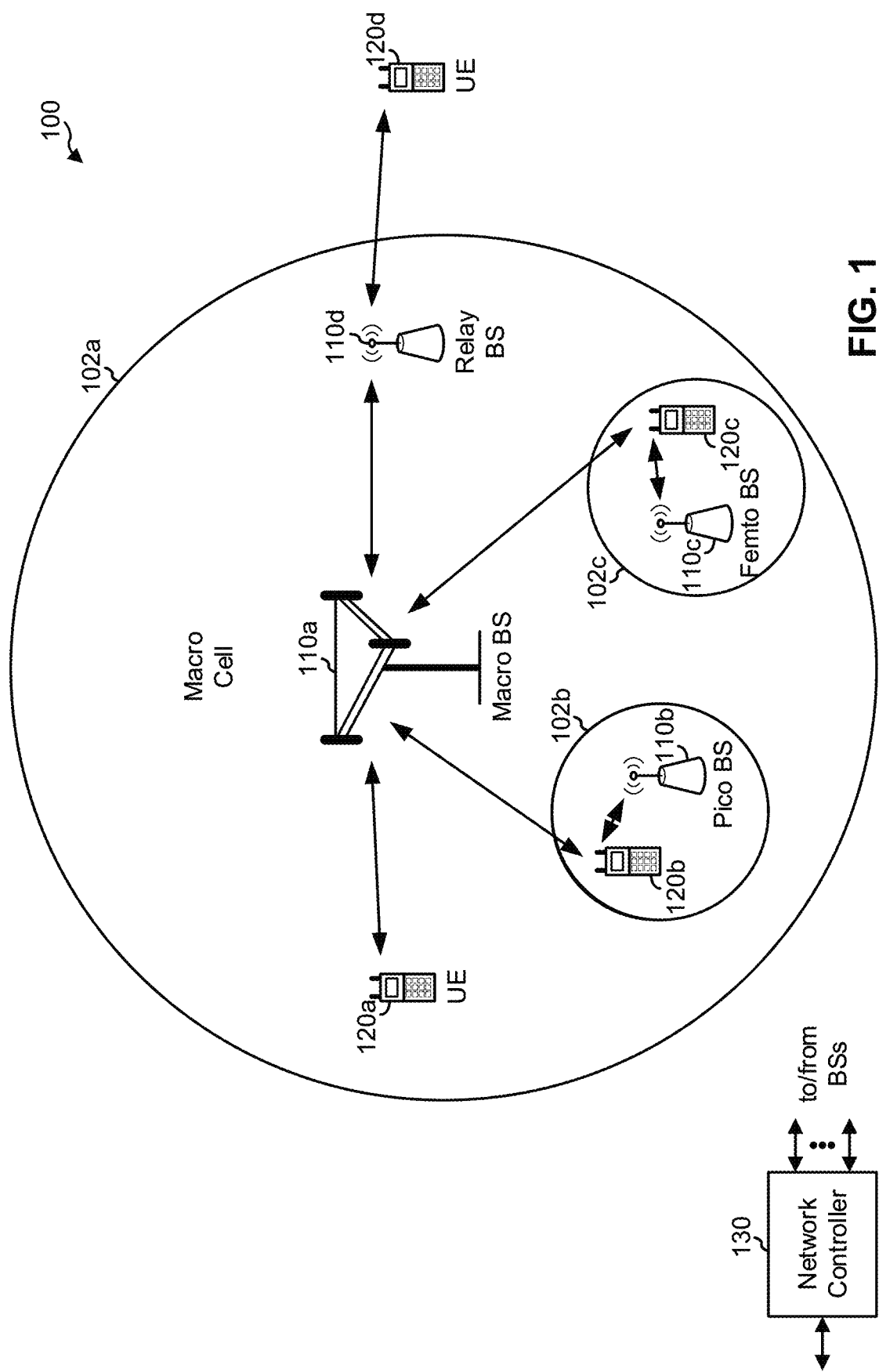
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
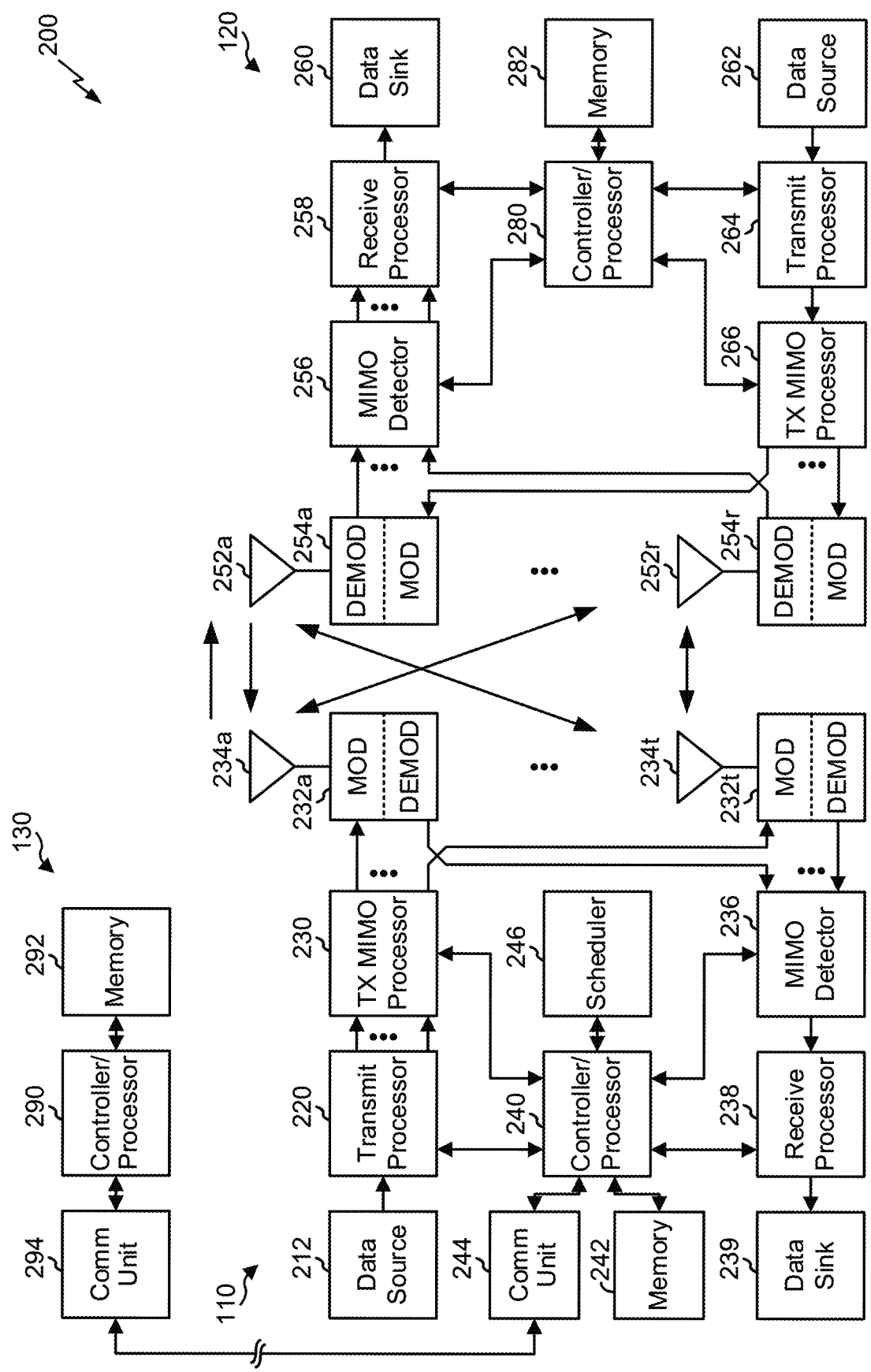
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. In some aspects, one or more components of UE 120 may be included in a housing.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with performing duplication bearer management, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a deactivation of a duplication bearer for a PDCP connection, means for scheduling data communication for a first link and not for a second link based at least in part on the deactivation of the duplication bearer, and/or the like. In some aspects, UE 120 may include means for establishing a duplication bearer for a PDCP connection to a network, means for detecting a failure of the first link, means for indicating the failure of the first link, and/or the like. In some aspects, such means may include one or more components of UE 120 described in connection with FIG. 2.

In some aspects, base station 110 may include means for determining a deactivation of a duplication bearer for a PDCP connection, means for scheduling data communication for a first link and not for a second link based at least in part on the deactivation of the duplication bearer, and/or the like. In some aspects, base station 110 may include means for establishing a duplication bearer for a PDCP connection to UE 120, means for receiving an indication of a failure of the first link, means for reestablishing, reconfiguring, releasing, or resetting the duplication bearer after receiving the indication of the failure of the first link, and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
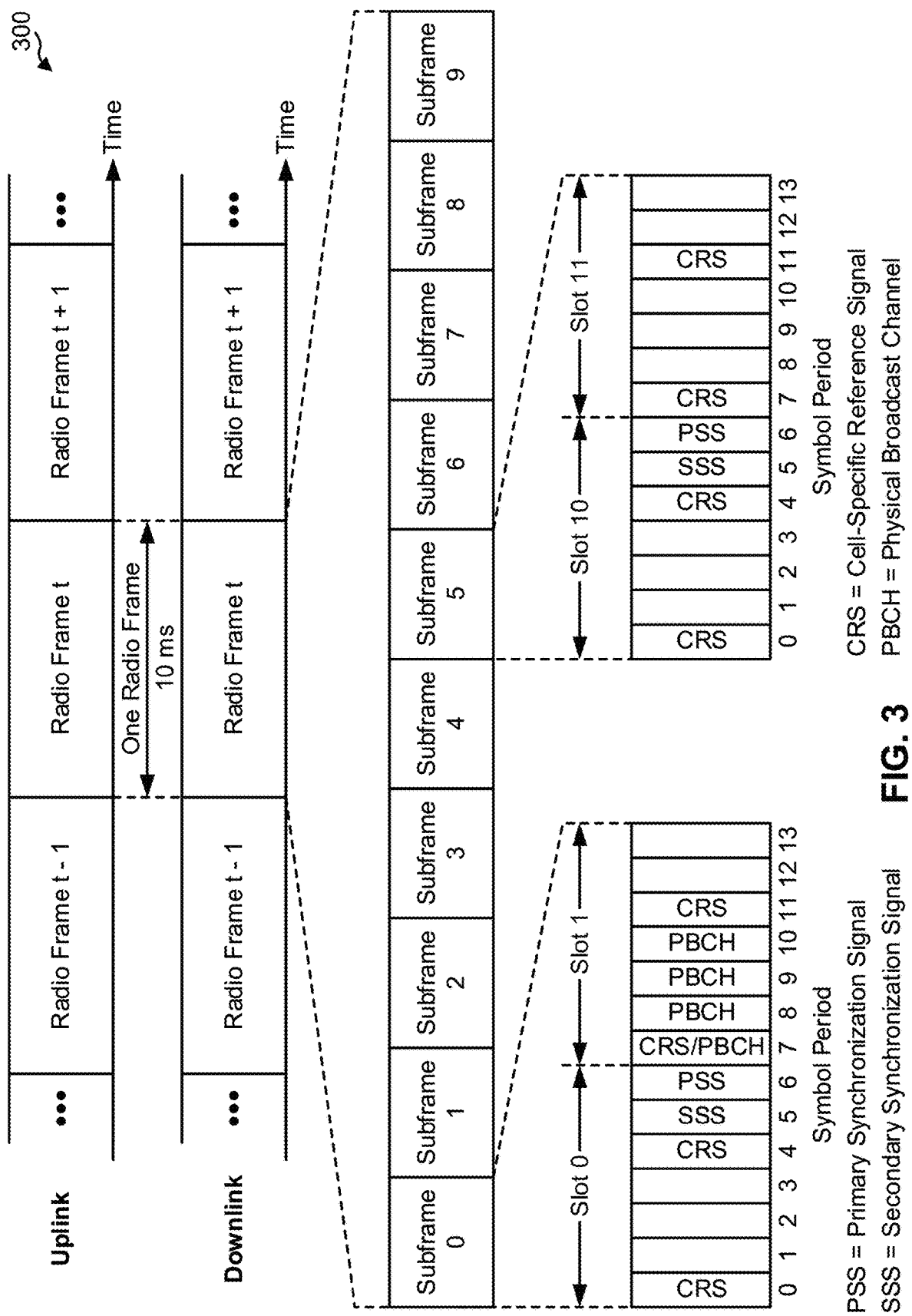
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
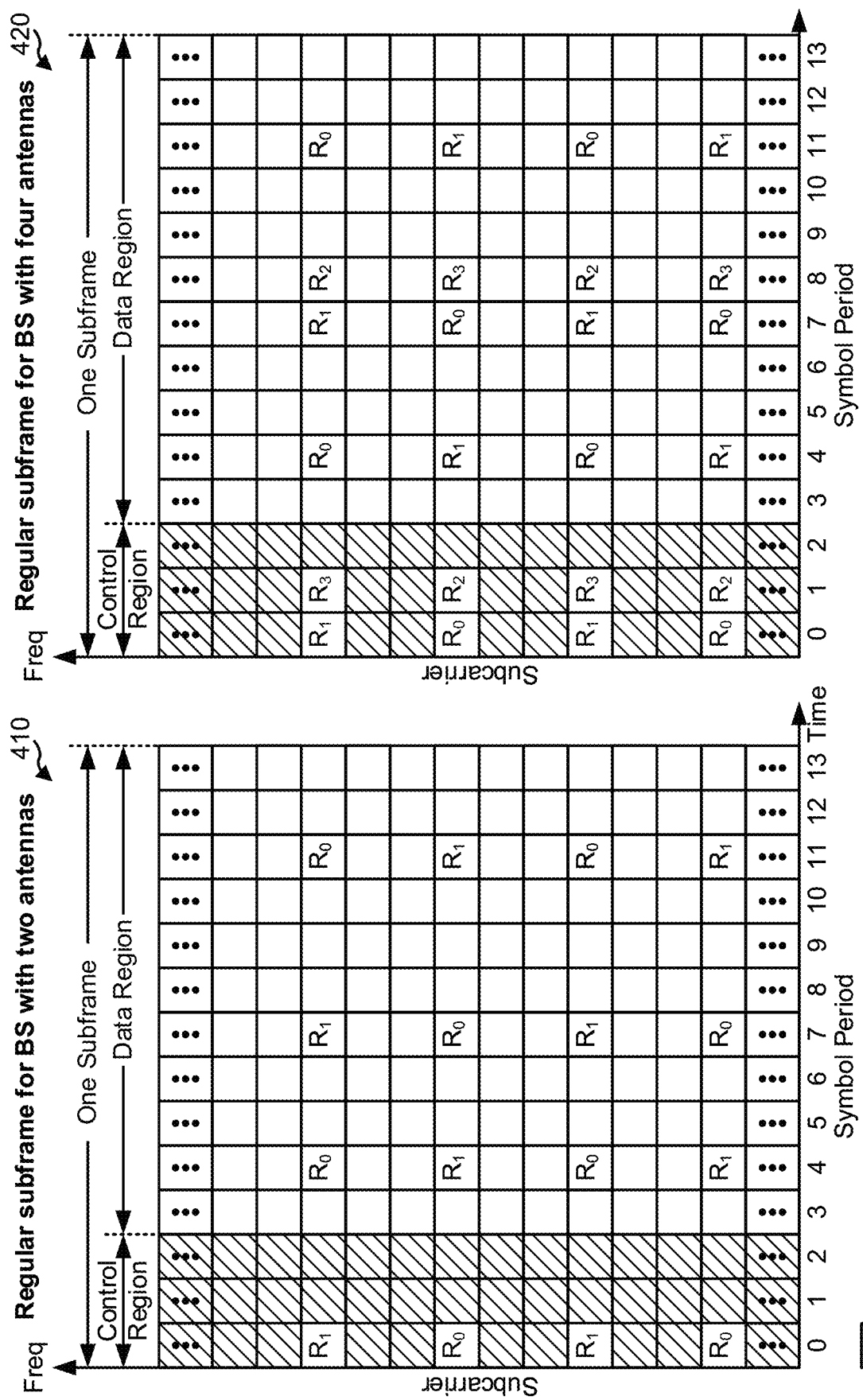
FIG. 4 is a block diagram conceptually illustrating two example subframe formats with the normal cyclic prefix, in accordance with various aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
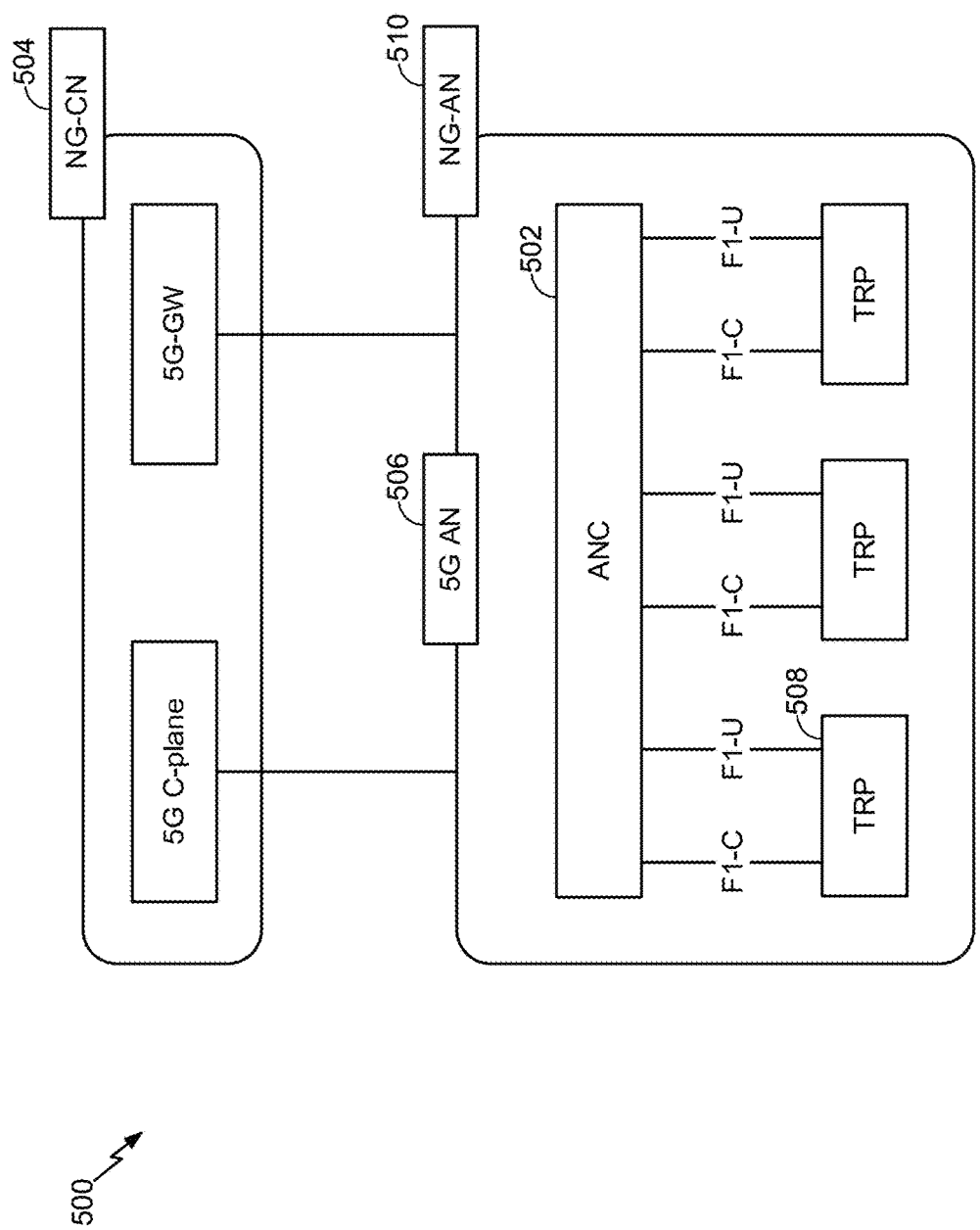
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
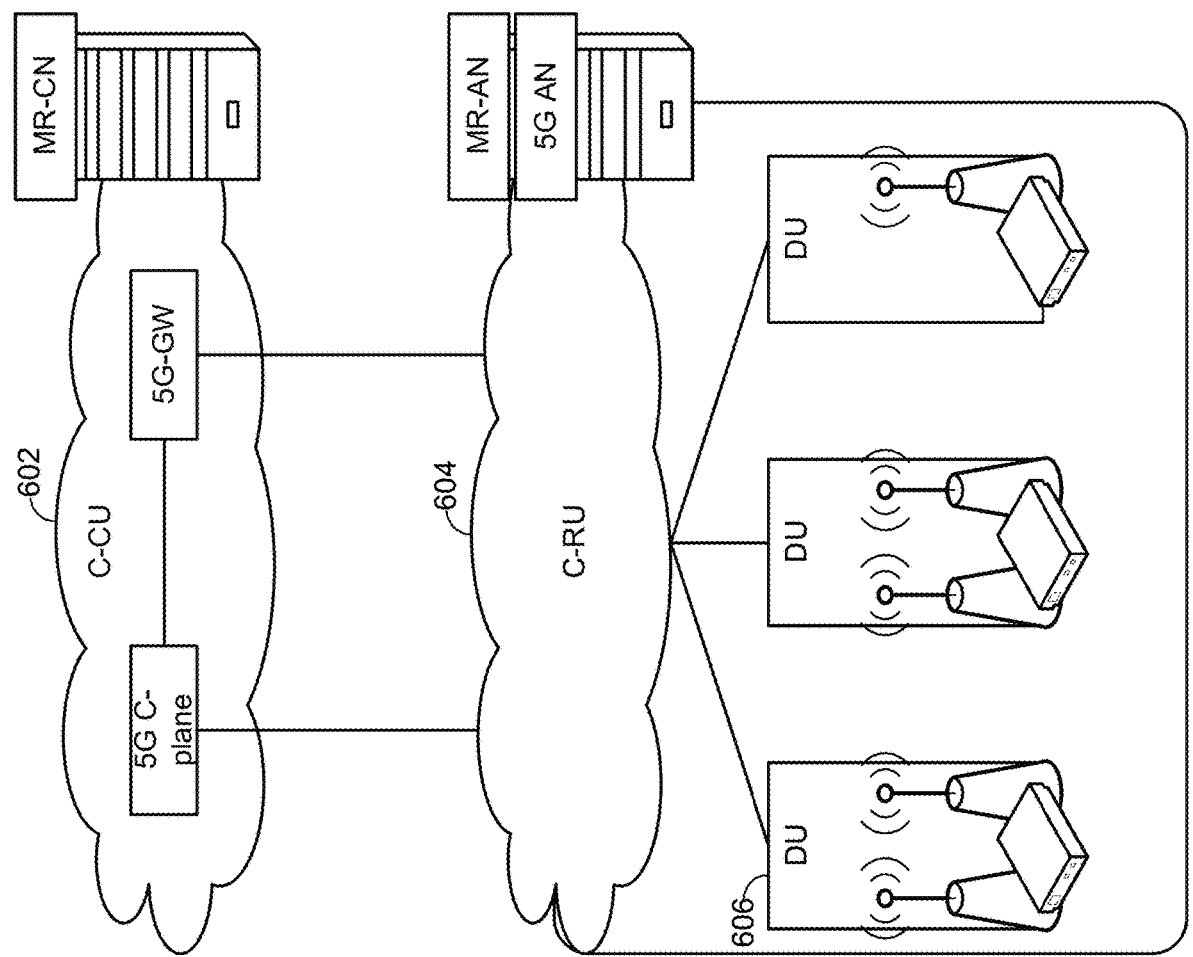
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

A duplication bearer is a type of split bearer that may be established to enable communication between a UE and a BS with packet duplication. For example, the UE and the BS may establish the duplication bearer, which may include multiple links, such as a first link configured as a default link and a second link configured as a duplication link. Under packet data convergence protocol (PDCP), first data may be buffered for the first link for transmission, and second data may be buffered for the second link for transmission. The second data may be a duplication of the first data to provide redundancy for communication between the UE and the BS.

However, when the duplication bearer is deactivated, residual data may remain to be scheduled for transmission using the first link and/or may be buffered for transmission using the second link. Moreover, when the first link of the duplication bearer experiences a failure, residual data may remain to be scheduled for transmission using the first link or the second link. Some aspects, described herein, may provide a mechanism for managing a duplication bearer. For example, a UE or a BS may determine a deactivation of a duplication bearer and may schedule data communication for the default link and not for the duplication link based at least in part on the deactivation of the duplication bearer. Additionally, or alternatively, a UE may detect a failure of a default link and may indicate the failure of the default link to a BS to trigger a response action. In this case, the BS may receive the indication of the failure of the first link, and may reestablish, reconfigure, release, or reset the duplication bearer. In this way, duplication bearers may be managed after a failure or deactivation, thereby improving network performance.

Figure 9:
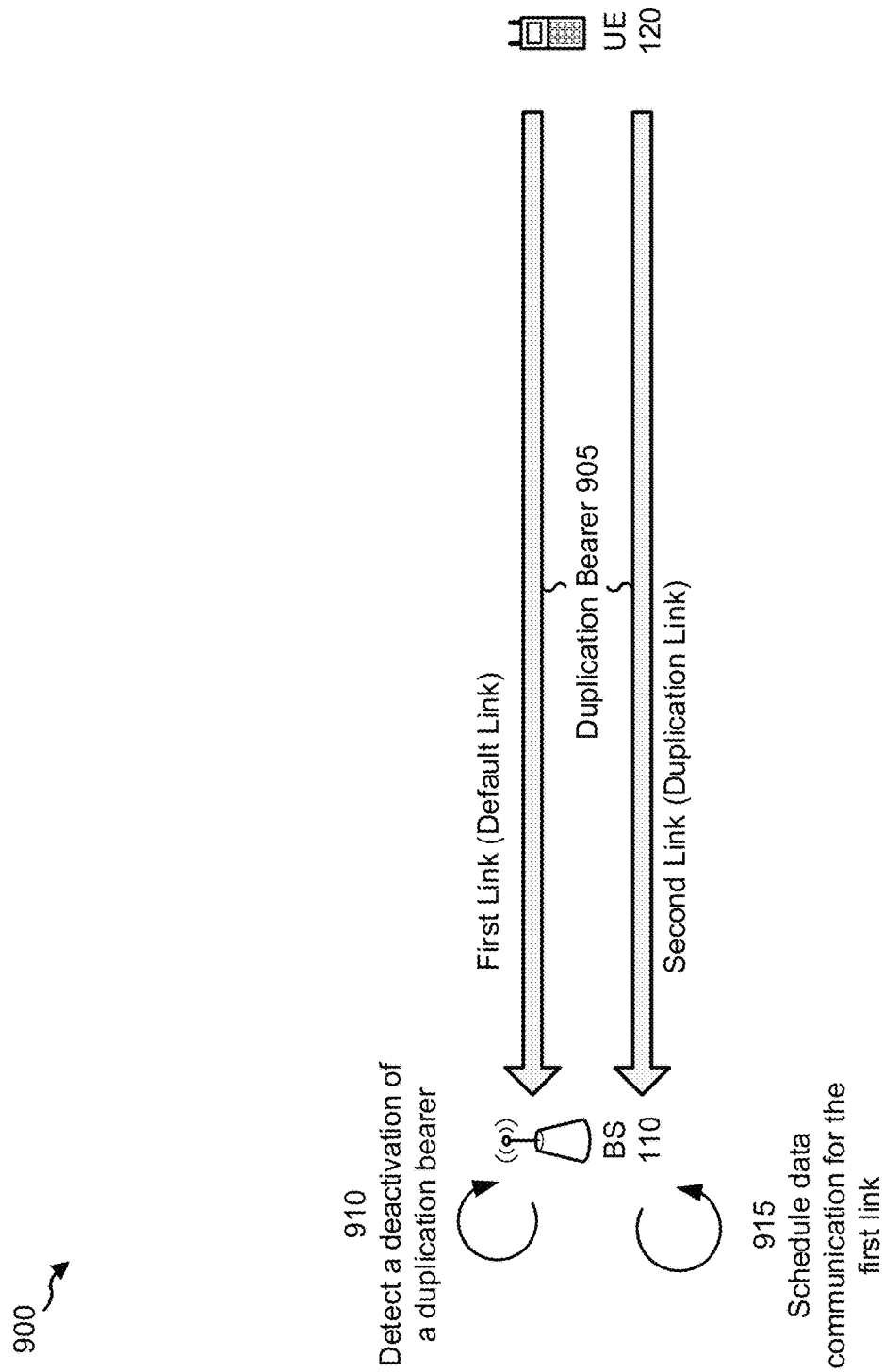
FIG. 9 is a diagram illustrating an example of duplication bearer management, in accordance with various aspects of the present disclosure.

FIG. 9 is a diagram illustrating an example 900 of duplication bearer management, in accordance with various aspects of the present disclosure. As shown in FIG. 9, example 900 includes a BS 110 and a UE 120 in communication via a duplication bearer 905. In some aspects, duplication bearer may include a first link configured as a default link and a second link configured as a duplication link. For example, BS 110 may configure the first link as the default link and the second link as the duplication link when establishing duplication bearer 905 with UE 120.

As further shown in FIG. 9, and by reference number 910, BS 110 may detect a deactivation of duplication bearer 905 for a PDCP connection. For example, BS 110 may detect the deactivation of duplication bearer 905 based at least in part on receiving a status message indicating the deactivation of duplication bearer 905. In some aspects, BS 110 may determine that duplication bearer 905 is to be deactivated, and may deactivate the duplication bearer. For example, based at least in part on a characteristic of a network, BS 110 may determine that duplication bearer 905 is to be deactivated. In some aspects, BS 110 may deactivate duplication for duplication bearer 905, and may maintain duplication bearer 905 as a bearer with duplication deactivated.

Although some aspects, described herein, are described in terms of BS 110 detecting a deactivation of a duplication bearer, some aspects described herein may include UE 120 detecting a deactivation of a duplication bearer.

As further shown in FIG. 9, and by reference number 915, BS 110 may schedule data for communication using the first link. For example, BS 110 may schedule the data for communication using the first link of duplication bearer 905 based at least in part on detecting the deactivation of duplication bearer 905. In some aspects, BS 110 may not schedule the data for communication using the second link. For example, based at least in part on detecting deactivation of duplication bearer 905, BS 110 may determine to schedule the data for communication on the first link and not on the second link. In this case, BS 110 may schedule the data for communication without releasing the second link, and a PDCP connection of duplication bearer 905 may operate in a switching mode.

In some aspects, BS 110 may cause the first link to be utilized without a carrier restriction. For example, when the first link is associated with a first radio link control (RLC) instance and the second link is associated with a second RLC instance, and BS 110 may remove a carrier mapping restriction for RLC to enable UE 120 to transmit using the first link and not the second link. In some aspects, BS 110 may reestablish RLC for the second link after deactivation of duplication bearer 905. For example, after deactivation of duplication bearer 905 and after UE 120 transmits residual data, such as data buffered for the first link, BS 110 may reactivate duplication bearer 905. In some aspects, BS 110 may reactivate duplication bearer 905 and reestablish the second link before transmission of residual data. In some aspects, BS 110 may cause UE 120 to complete an unfinished transmission of buffered data on the second link after deactivation of the duplication bearer. For example, BS 110 may schedule the buffered data for transmission before reactivation of duplication bearer 905. Additionally, or alternatively, BS 110 may cease scheduling of data for transmission on the second link after deactivation of duplication bearer 905.

In some aspects, BS 110 may cause data to be buffered for transmission using the second link based at least in part on reactivating duplication bearer 905. For example, BS 110 may cause a PDCP connection of UE 120 to buffer duplicate data for transmission using the second link. In this case, a same PDCP data volume may be reported for both the first link and the second link based at least in part on buffering the duplicate data for transmission using the second link. In some aspects, based at least in part on deactivation of duplication bearer 905 and ceasing of scheduling of data for transmission on the second link, BS 110 may cause UE 120 to cease including, in a buffer status report, information identifying data volume for the second link.

Although some aspects, described herein, are described in terms of BS 110 scheduling data communication for the first link, some aspects described herein may include UE 120 scheduling data communication for the first link.

As indicated above, FIG. 9 is provided as an example. Other examples are possible and may differ from what was described with respect to FIG. 9.

Figure 10:
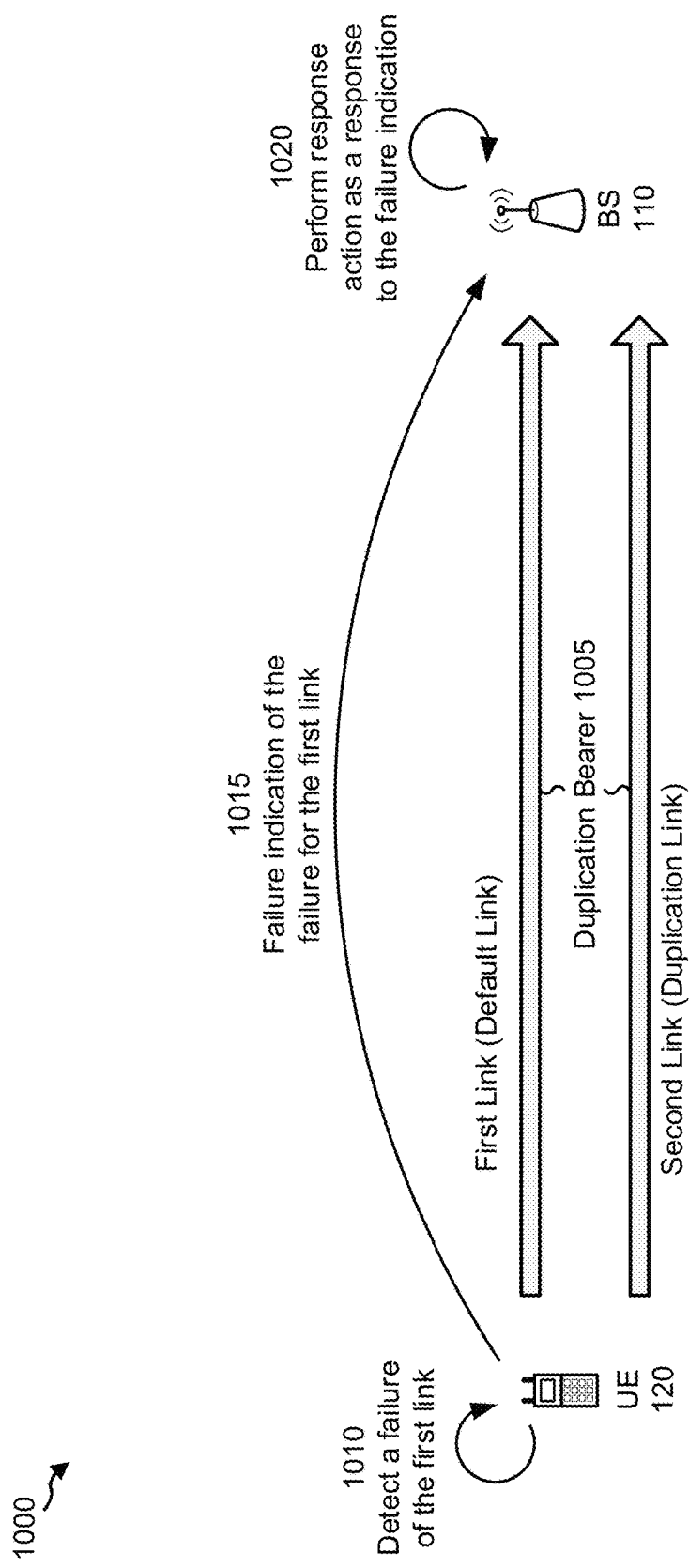
FIG. 10 is a diagram illustrating an example of duplication bearer management, in accordance with various aspects of the present disclosure.

FIG. 10 is a diagram illustrating an example 1000 of duplication bearer management, in accordance with various aspects of the present disclosure. As shown in FIG. 10, example 1000 includes a BS 110 and a UE 120 in communication via a duplication bearer 1005. In some aspects, duplication bearer 1005 may be associated with a first link configured as a default link and a second link configured as a duplication link. In some aspects, UE 120 and/or BS 110 may establish duplication bearer 1005. For example, UE 120 and/or BS 110 may establish duplication bearer 1005 to enable redundancy for transmission of data from UE 120 to BS 110. In some aspects, UE 120 and BS 110 may configure the duplication bearer. For example, BS 110 may configure the first link of duplication bearer 1005 as a default link of duplication bearer 1005 and the second link as a duplication link of duplication bearer 1005.

As further shown in FIG. 10, and by reference number 1010, UE 120 may detect a failure of the first link. For example, during transmission of data to BS 110 via duplication bearer 1005, UE 120 may detect the failure of the first link of duplication bearer 1005. In some aspects, UE 120 may detect a secondary cell group (SCG) type of failure for duplication bearer 1005. For example, UE 120 may determine an SCG failure relating to a timer, such as a SCG change failure timer, an SCG physical layer (PHY) failure timer, an SCG media access control (MAC) layer failure timer, an SCG RLC failure timer, and/or the like. In this case, based at least in part on the timer expiring (e.g., based at least in part on a message failing to be sent within a particular period of time, a reconfiguration failing to be completed within a particular period of time, and/or the like), UE 120 may detect the failure of the first link.

As further shown in FIG. 10, and by reference number 1015, UE 120 may provide, and BS 110 may receive a failure indication of the failure for the first link. For example, UE 120 may provide information indicating that the failure is an SCG failure for the first link. In some aspects, UE 120 may provide the failure indication via the second link. For example, UE 120 may provide and BS 110 may receive a signaling radio bearer (SRB) message indicating the SCG failure via the second link. In some aspects, UE 120 may provide and BS 110 may receive an SRB message via the first link to cause BS 110 to perform a radio resource control (RRC) reestablishment procedure, a link release procedure, and/or the like.

In some aspects, UE 120 may continue transmission on the second link. For example, UE 120 may transmit duplicate data buffered for the second link on the second link after detecting the failure of the first link. In this way, communication may continue for UE 120 and BS 110 after a link failure. In some aspects, UE 120 and/or BS 110 may configure the second link to enable transmission to continue on the second link. For example, UE 120 and/or BS 110 may alter an RLC configuration to enable transmission to continue on the second link. In some aspects, UE 120 may stop transmission on the second link after detecting the failure of the first link. For example, UE 120 may cease transmission on the second link after detecting the failure of the first link and without using the second link to transmit residual duplicate data buffered for the second link.

As further shown in FIG. 10, and by reference number 1020, BS 110 may perform a response action as a response to the failure indication. For example, BS 110 may reestablish duplication bearer 1005. In this case, BS 110 may transmit information to UE 120 associated with reestablishing a PDCP connection and RLC for duplication bearer 1005. Additionally, or alternatively, BS 110 may release duplication bearer 1005. For example, BS 110 may remove RLC from duplication bearer 1005. Additionally, or alternatively, BS 110 may reset duplication bearer 1005. For example, BS 110 may reestablish the first link to reset duplication bearer 1005.

Additionally, or alternatively, BS 110 may reconfigure duplication bearer 1005. For example, BS 110 may add a link to duplication bearer 1005, remove a link from duplication bearer 1005, and/or the like. In some aspects, BS 110 may perform another type of reconfiguration of duplication bearer 1005. For example, BS 110 may change the first link, a bearer type of duplication bearer 1005, a bearer operation mode of duplication bearer 1005, and/or the like to reconfigure duplication bearer 1005.

In some aspects, UE 120 may receive information identifying a response action performed by BS 110. For example, UE 120 may receive a reestablishment message indicating that BS 110 is reestablishing duplication bearer 1005. Additionally, or alternatively, UE 120 may receive a release message indicating that BS 110 is releasing duplication bearer 1005. In some aspects, the received information may trigger UE 120 to reconfigure the first link. For example, based at least in part on receiving the reestablishment message, UE 120 may reconfigure the first link as the default link for duplication bearer 1005.

As indicated above, FIG. 10 is provided as an example. Other examples are possible and may differ from what was described with respect to FIG. 10.

Figure 11:
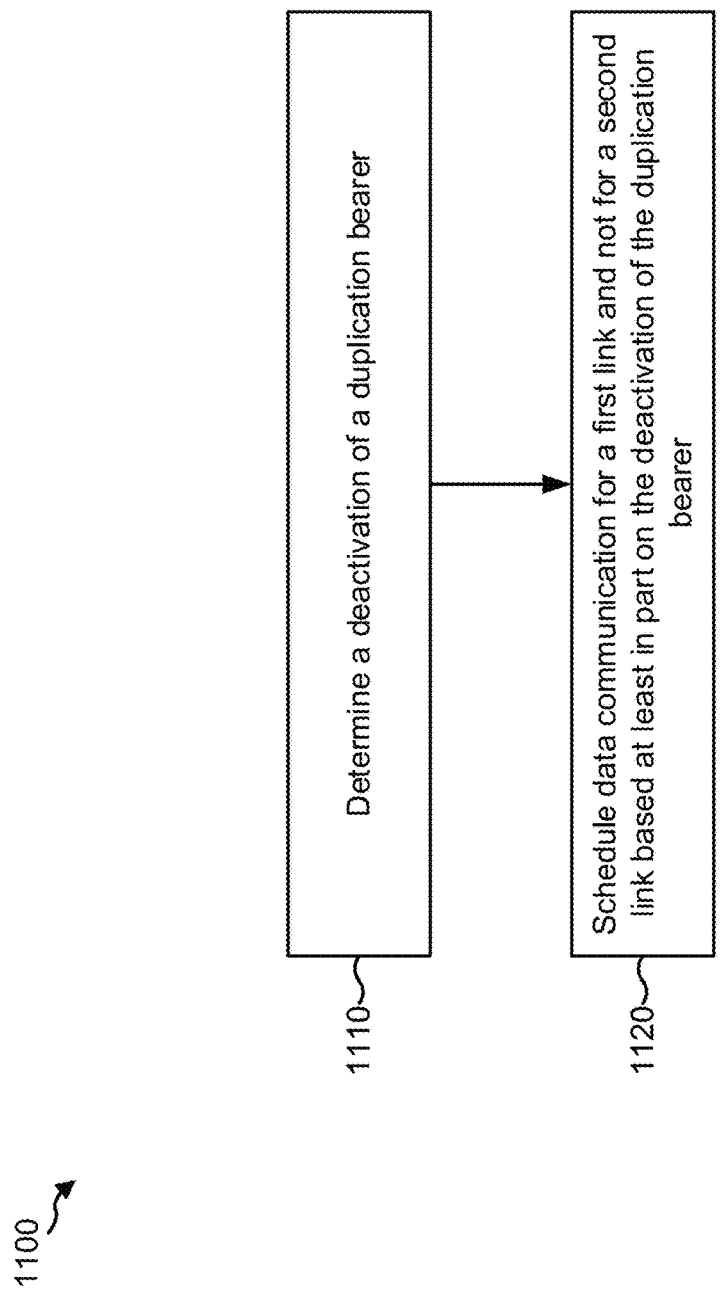
FIG. 11 is a diagram illustrating an example process performed, for example, by a device, such as a user equipment or a base station, in accordance with various aspects of the present disclosure.

FIG. 11 is a diagram illustrating an example process 1100 performed, for example, by a device, in accordance with various aspects of the present disclosure. Example process 1100 is an example where a device (e.g., BS 110 or UE 120) performs duplication bearer management.

As shown in FIG. 11, in some aspects, process 1100 may include determining a deactivation of a duplication bearer (block 1110). For example, the device (e.g., using controller/processor 240, controller/processor 280, and/or the like) may determine the deactivation of the duplication bearer for a PDCP connection, as described in more detail above. In some aspects, a first link and a second link are configured for the duplication bearer.

As further shown in FIG. 11, in some aspects, process 1100 may include scheduling data communication for a first link and not for a second link based at least in part on deactivation of the duplication bearer (block 1120). For example, the device (e.g., using controller/processor 240, controller/processor 280, and/or the like) may schedule data communication for the first link and not for the second link based at least in part on deactivation of the duplication bearer, as described in more detail above.

Process 1100 may include additional aspects, such as any single aspect or any combination of aspects described below and/or in connection with one or more other processes described elsewhere herein.

In some aspects, a carrier restriction is removed based at least in part on the deactivation of the duplication bearer. In some aspects, radio link control is established for the second link based at least in part on deactivation of the duplication bearer. In some aspects, the device is configured to schedule data communication for the second link at activation of the duplication bearer. In some aspects, the data communication is configured to be transmitted on the first link without releasing the second link.

In some aspects, the first link is associated with a first radio link control instance and the second link is associated with a second radio link control instance, and the first radio link control instance and the second radio link control instance are associated with the PDCP connection. In some aspects, the device is configured to report a radio link control data volume to a corresponding one of the first link or the second link after activation of the duplication bearer. In some aspects, an unfinished transmission of buffered data is completed on the second link after deactivation of the duplication bearer.

In some aspects, an unfinished transmission of buffered data is stopped on the second link after deactivation of the duplication bearer. In some aspects, the device is configured not to schedule data for transmission on the second link after deactivation of the duplication bearer. In some aspects, a buffer status report does not include information identifying a data volume for the second link after deactivation of the duplication bearer.

In some aspects, a UE may transmit duplicated PDCP packet data units (PDUs) on a first, primary radio link control (RLC) entity and on a second, secondary RLC entity, thereby improving reliability, reducing latency, and/or the like, which may support ultra-reliable low latency communications (URLLC) services. In some aspects, a duplication bearer may be activated and/or deactivated for a data radio bearer (DRB) by the UE or BS receiving an activation or deactivation media access control (MAC) control element (CE). In some aspects, on activation, a PDCP PDU may be duplicated to multiple RLC entities for data PDUs and may not be duplicated to multiple entities for control PDUs.

In some aspects, on activation, a PDCP data volume may be indicated to a MAC entity associated with a primary RLC entity, and a PDCP data volume excluding PDCP control PDUs may be indicated to another MAC entity associated with a secondary RLC entity. In some aspects, a duplicate PDCP data PDU may be discarded when another duplicate of the PDCP data PDU is successfully transmitted. In some aspects, duplicate PDCP PDUs may be transmitted on different carriers. In some aspects, when an RLC entity acknowledges the transmission of a PDCP PDU, a PDCP entity may indicate to another RLC entity to discard a duplicate PDCP PDU; and when a secondary RLC entity satisfies a maximum quantity of retransmissions for a PDCP PDU, the UE may indicate to the BS, but may not trigger a radio link failure (RLF).

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
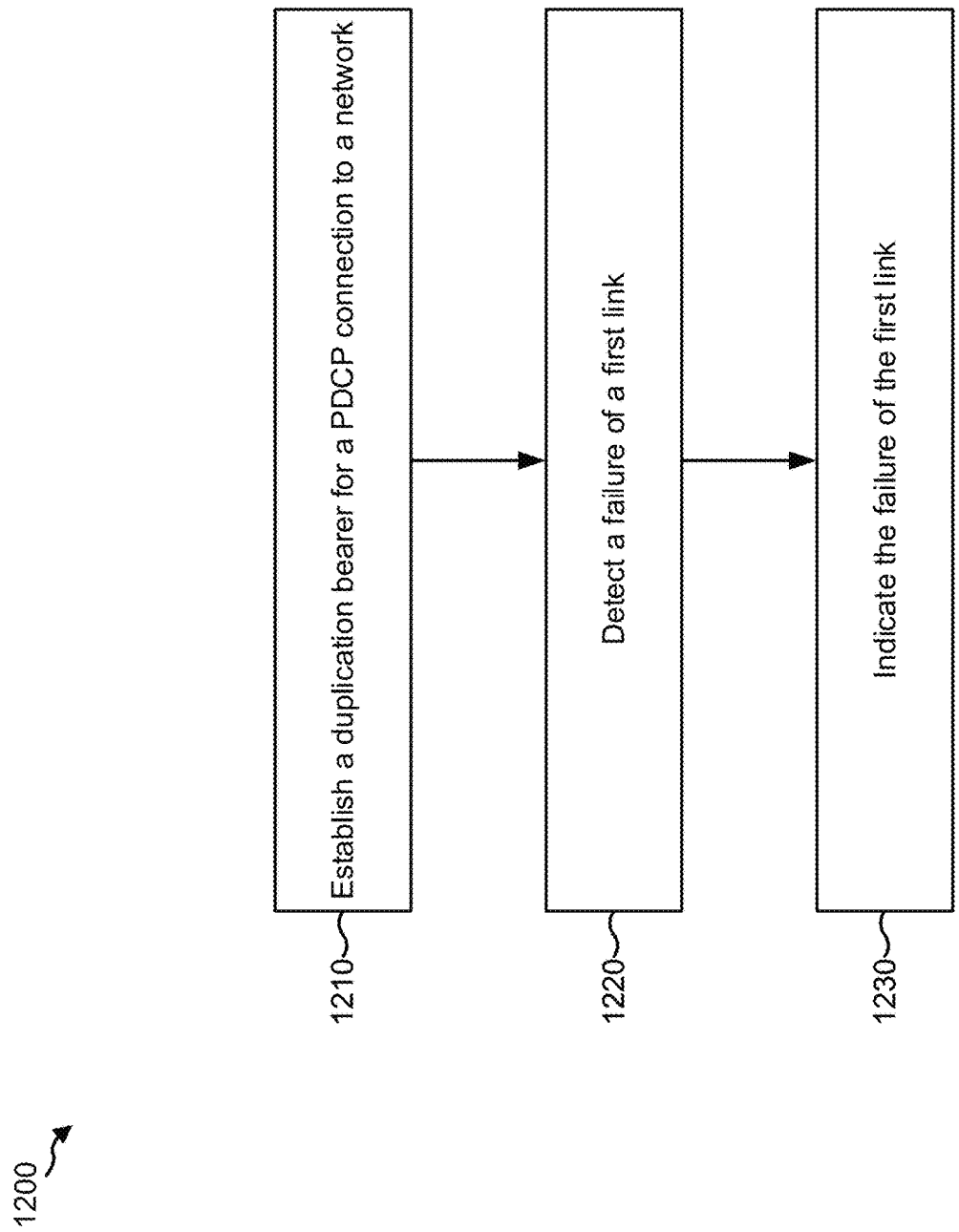
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where a UE (e.g., UE 120) performs duplication bearer management.

As shown in FIG. 12, in some aspects, process 1200 may include establishing a duplication bearer for a PDCP connection to a network (block 1210). For example, the UE (e.g., using controller/processor 280 and/or the like) may establish the duplication bearer for the PDCP connection to a BS (e.g., BS 110), as described in more detail above. In some aspects, a first link is a default link for the duplication bearer and a second link is a duplication link for the duplication bearer.

As further shown in FIG. 12, in some aspects, process 1200 may include detecting a failure of a first link (block 1220). For example, after establishing the duplication bearer, the UE (e.g., using controller/processor 280 and/or the like) may detect the failure of the first link, as described in more detail above.

As further shown in FIG. 12, in some aspects, process 1200 may include indicating the failure of the first link (block 1230). For example, the UE (e.g., using controller/processor 280, transmit processor 264, TX MIMO processor 266, MOD 254, antenna 252, and/or the like) may indicate the failure of the first link to the BS based at least in part on detecting the failure of the first link, as described in more detail above.

Process 1200 may include additional aspects, such as any single aspect or any combination of aspects described below and/or in connection with one or more other processes described elsewhere herein.

In some aspects, data transmission on the second link is continued after the failure of the first link. In some aspects, data transmission on the second link is stopped after the failure of the first link. In some aspects, the first link is configured by the network. In some aspects, the failure is a secondary cell group failure.

In some aspects, indicating the failure includes indicating a type of the failure. In some aspects, an indication is received from the network to reconfigure the first link. In some aspects, the failure is indicated using the second link. In some aspects, an RRC reestablishment procedure is performed to reconfigure the first link. In some aspects, a reestablishment indication or a release indication is received for the duplication bearer.

In some aspects, the second link is used for conveying duplication packets. In some aspects, the second link is configured by the network to continue transmission on the second link. In some aspects, the duplication bearer is reestablished, reconfigured, released, or reset based at least in part on the failure of the first link.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
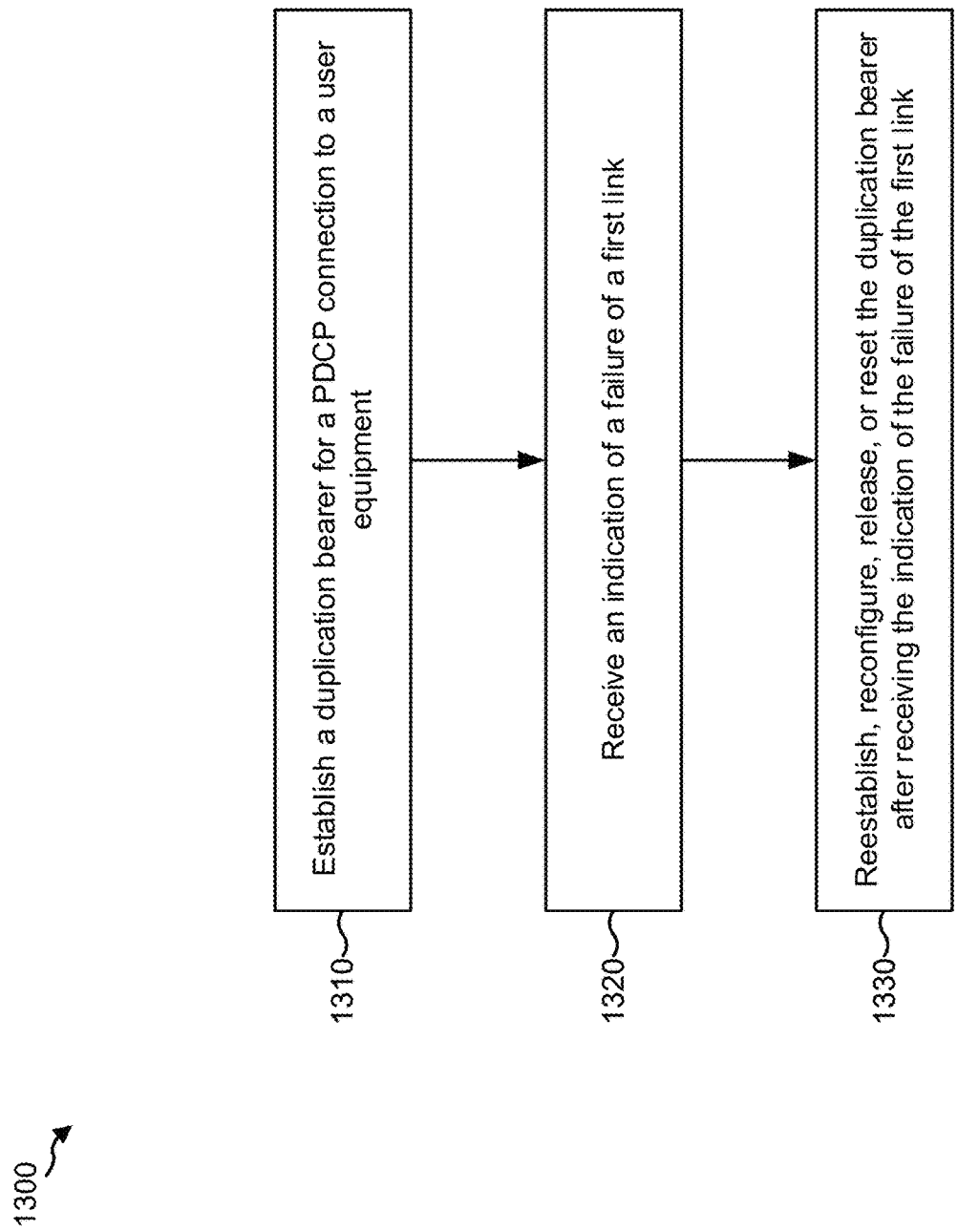
FIG. 13 is a diagram illustrating an example process performed, for example, by a base station, in accordance with various aspects of the present disclosure.

FIG. 13 is a diagram illustrating an example process 1300 performed, for example, by a BS, in accordance with various aspects of the present disclosure. Example process 1300 is an example where a BS (e.g., BS 110) performs duplication bearer management.

As shown in FIG. 13, in some aspects, process 1300 may include establishing a duplication bearer for a PDCP connection to a user equipment (block 1310). For example, the BS (e.g., using controller/processor 240 and/or the like) may establish the duplication bearer for the PDCP connection to the user equipment (e.g., UE 120), as described in more detail above. In some aspects, a first link is a default link for the duplication bearer and a second link is a duplication link for the duplication bearer.

As further shown in FIG. 13, in some aspects, process 1300 may include receiving an indication of a failure of a first link (block 1320). For example, after establishing the duplication bearer for the PDCP connection, the BS (e.g., using antenna 252, DEMOD 254, MIMO detector 256, receive processor 258, controller/processor 280, and/or the like) may receive, from the user equipment, an indication of the failure of the first link, as described in more detail above.

As further shown in FIG. 13, in some aspects, process 1300 may include reestablishing, reconfiguring, releasing, or resetting the duplication bearer after receiving the indication of the failure of the first link (block 1330). For example, based at least in part on receiving the indication of the failure of the first link, the BS (e.g., using controller/processor 240 and/or the like) may reestablish, reconfigure, release, or reset the duplication bearer based at least in part on receiving the indication of the failure of the first link, as described in more detail above Process 1300 may include additional aspects, such as any single aspect or any combination of aspects described below and/or in connection with one or more other processes described elsewhere herein.

In some aspects, establishing the duplication bearer includes configuring the first link and/or the second link. In some aspects, the failure of the first link is a secondary cell group failure. In some aspects, reconfiguring the duplication bearer includes a change to the first link, a change to a bearer type, a change to a bearer operation mode, and/or the like.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
   determining, by a device, a deactivation of a duplication bearer for a packet data convergence protocol (PDCP) connection,
      wherein the device is a base station, and
      wherein a first link and a second link are configured for the duplication bearer; and
   scheduling, by the device, data communication for the first link and not for the second link based at least in part on the deactivation of the duplication bearer.

2. The method of claim 1, wherein a carrier restriction is removed based at least in part on the deactivation of the duplication bearer.

3. The method of claim 1, wherein radio link control is established for the second link based at least in part on deactivation of the duplication bearer.

4. The method of claim 1, wherein the device is configured to schedule data communication for the second link at activation of the duplication bearer.

5. The method of claim 1, wherein the data communication is configured to be transmitted on the first link without releasing the second link.

6. The method of claim 1, wherein the first link is associated with a first radio link control instance and the second link is associated with a second radio link control instance, wherein the first radio link control instance and the second radio link control instance are associated with the PDCP connection.

7. The method of claim 1, wherein the device is configured to report a radio link control data volume to a corresponding one of the first link or the second link after activation of the duplication bearer.

8. The method of claim 1, wherein an unfinished transmission of buffered data is completed on the second link after deactivation of the duplication bearer.

9. The method of claim 1, wherein an unfinished transmission of buffered data is stopped on the second link after deactivation of the duplication bearer.

10. The method of claim 1, wherein the device is configured not to schedule data for transmission on the second link after deactivation of the duplication bearer.

11. The method of claim 1, wherein a buffer status report does not include information identifying a data volume for the second link after the deactivation of the duplication bearer.

12. The method of claim 1, wherein the deactivation of the duplication bearer is determined based at least in part on receiving a status message indicating the deactivation of the duplication bearer.

13. A method of wireless communication, comprising:

establishing, by a user equipment, a duplication bearer for a packet data convergence protocol (PDCP) connection to a network;
  wherein a first link is a default link for the duplication bearer and a second link is a duplication link for the duplication bearer;
detecting, by the user equipment, a failure of the first link based on a secondary cell group (SCG) type of failure relating to a timer; and
indicating, by the user equipment and to the network, the failure of the first link.

14. The method of claim 13, wherein data transmission on the second link is continued after the failure of the first link.

15. The method of claim 13, wherein data transmission on the second link is stopped after the failure of the first link.

16. The method of claim 13, wherein the first link is configured by the network.

17. The method of claim 13, wherein indicating the failure comprises indicating a type of the failure.

18. The method of claim 13, wherein an indication is received from the network to reconfigure the first link.

19. The method of claim 13, wherein the failure is indicated using the second link.

20. The method of claim 13, wherein a radio resource control (RRC) reestablishment procedure is performed to reconfigure the first link.

21. The method of claim 13, wherein a reestablishment indication or a release indication is received for the duplication bearer.

22. The method of claim 13, wherein the second link is used for conveying duplication packets.

23. The method of claim 13, wherein the second link is configured by the network to continue transmission on the second link.

24. The method of claim 13, wherein the duplication bearer is reestablished, reconfigured, released, or reset based at least in part on the failure of the first link.

25. A method of wireless communication, comprising:
establishing, by a base station, a duplication bearer for a packet data convergence protocol (PDCP) connection to a user equipment;
  wherein a first link is a default link for the duplication bearer and a second link is a duplication link for the duplication bearer;
  receiving, by the base station, an indication of a failure of the first link,
    wherein the failure is a secondary cell group (SCG) type of failure relating to a timer; and
  reestablishing, reconfiguring, releasing, or resetting, by the base station, the duplication bearer after receiving the indication of the failure of the first link.

26. The method of claim 25, wherein establishing the duplication bearer comprises configuring at least one of the first link or the second link.

27. The method of claim 25, wherein reestablishing, reconfiguring, releasing, or resetting the duplication bearer comprises a change to at least one of:
the first link,
a bearer type, or
a bearer operation mode.

28. A device for wireless communication, comprising:
a memory; and
at least one processor coupled to the memory, the memory and the at least one processor configured to:
  determine a deactivation of a duplication bearer for a packet data convergence protocol (PDCP) connection,
    wherein the device is a base station, and
    wherein a first link and a second link are configured for the duplication bearer; and
  schedule data communication for the first link and not for the second link based at least in part on the deactivation of the duplication bearer.

29. The device of claim 28, wherein a carrier restriction is removed based at least in part on the deactivation of the duplication bearer.

30. The device of claim 28, wherein a buffer status report does not include information identifying a data volume for the second link after the deactivation of the duplication bearer.

31. The device of claim 28, wherein the deactivation of the duplication bearer is determined based at least in part on receiving a status message indicating the deactivation of the duplication bearer.

* * * * *